United States Patent [19]

Eichenlaub

[11] Patent Number: 4,717,949

[45] Date of Patent: Jan. 5, 1988

[54] AUTOSTEREOSCOPIC DISPLAY WITH ILLUMINATING LINES AND LIGHT VALVE

[75] Inventor: Jesse B. Eichenlaub, Rochester, N.Y.

[73] Assignee: Dimension Technologies, Inc., Rochester, N.Y.

[21] Appl. No.: 837,279

[22] Filed: Mar. 7, 1986

[51] Int. Cl.⁴ .................. H04N 15/00; H04N 13/04; G04G 3/02

[52] U.S. Cl. .......................... 358/3; 358/88; 340/716; 350/131

[58] Field of Search ............ 358/2, 3, 88, 90, 91, 358/92; 350/131, 133, 134, 139, 141, 143; 340/705, 716

[56] References Cited

U.S. PATENT DOCUMENTS

| | | | |
|---|---|---|---|
| 2,209,747 | 7/1940 | Eisler | 178/6.5 |
| 3,701,586 | 10/1972 | Goetz | 358/90 |
| 3,746,785 | 7/1973 | Goodrich | 358/90 |
| 4,367,486 | 1/1983 | Eichenlaub | 358/88 |
| 4,461,541 | 7/1984 | Duthie | 358/88 |
| 4,484,219 | 11/1984 | Kirk | 358/90 |
| 4,566,031 | 1/1986 | Kirk | 358/90 |

Primary Examiner—James J. Groody
Assistant Examiner—Robert M. Bauer
Attorney, Agent, or Firm—Robert M. Phipps

[57] ABSTRACT

A flat screen autostereoscopic display for bright wide angle stereoscopic images employs a flat screen on which are displayed a plurality of thin, vertical light emitting lines. A light valve located in front of the screen forms images by varying the transparency of individual pixels arranged in a raster pattern across its surface. The screen and light valve are arranged in such a way that an observer sees the light emitting lines through one set of pixels with the left eye and the same lines through a different set of pixels with the right eye.

11 Claims, 10 Drawing Figures

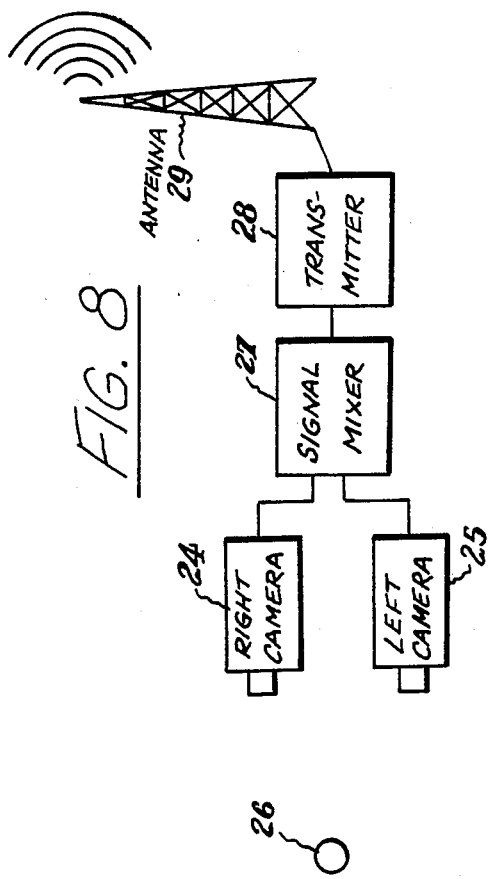
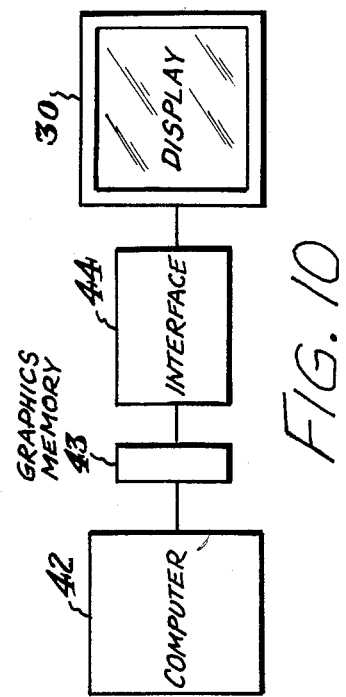
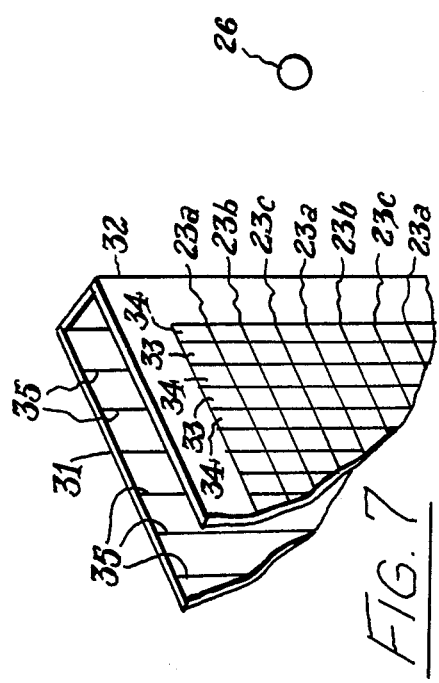
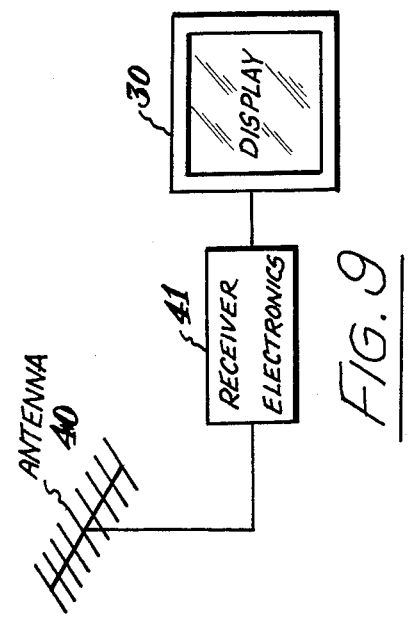

700
AUTOSTEREOSCOPIC DISPLAY WITH ILLUMINATING LINES AND LIGHT VALVE

BACKGROUND

1. Field of the Invention

This invention relates to a flat screen autostereoscopic device for use in television, computer graphics, and the like viewing applications.

2. Prior Art

A simple, low cost autostereoscopic system capable of providing clear, bright, high resolution images has long been a goal of the television and computer graphics industry. Previous attempts to produce such a device have experienced the problems of high development costs, expensive equipment, e.g., vibrating components or lenses of various sorts, and bulky size. However, recent developments in the field of transparent flat screen image displays promise low cost, simple and compact autostereoscopic displays which use previously developed components.

U.S. Pat. No. 2,209,747 (Eisler) discloses placing an opaque screen with a plurality of transparent slits in front of a second screen which displays a stereoscopic pair of images made up of alternating strips. Each strip displays a thin vertical section of one of the images. The strips are arranged so that the first displays a section of the right eye image, the second a section of the left eye image, the third a section of the right eye image and so on. The screen with the transparent slits is placed at such a distance in front of the picture display that the observer sees only the right eye strips through the slits with his right eye and only the left eye strips through the slits with his left eye. This technique of displaying stereographic pictures is known as the Hess system. Devices using this technique are very cheap and easy to build. However, for good images the slits have to be very thin, relative to the opaque area between them, and thus a large fraction of the light coming from the display is blocked. This makes it difficult to obtain bright images.

U.S. Pat. No. 4,367,486 (Eichenlaub) discloses how three dimensional images can be viewed with appropriate perspective from many different angles. These images are created with a pinhole aperture of vertical slit that is scanned across a surface situated in front of a cathode ray tube (CRT) that displays images in rapid succession. The patent also discloses how the light blocking problems associated with small apertures could be eliminated by using a similar optical technique, but employing a moving light source in place of a pinhole and a surface that displays transparent images in place of the prior art CRT. This results in bright, clear three dimensional images.

There continues to be a need for a simple means of forming and viewing stereoscopic images.

Accordingly it is an object of this invention to provide a flat screen autostereoscopic display device.

It is a further object of this invention to provide a flat screen autostereoscopic display device which is low in cost and easy to manufacture.

Another object of this invention is to provide a flat screen autostereoscopic display device which is capable of providing large, bright, high resolution images and a wide field of view.

SUMMARY OF THE INVENTION

In accordance with this invention there is provided in an autostereoscopic display unit the improvement which comprises- (a) a flat surface screen displaying a multiplicity of thin parallel vertical light emitting lines across its surface, said screen remaining dark between said emitting lines, and (b) a light valve in front of and parallel to said screen, said light valve having individual picture elements arranged in a grid pattern across its surface, there being at least one pair of vertical columns of individual picture elements for each light emitting line, said light emitting line being located behind the boundary of said pair.

BRIEF DESCRIPTION OF THE DRAWINGS

FIG. 7 is an expanded view of a portion of the display unit of FIG. 1 when configured for color displays.

FIG. 8 is a schematic drawing of a system for sending modulated electromagnetic signals to be displayed on the autostereoscopic display of FIG. 1.

FIG. 9 is a schematic of a television receiving system wherein the screen is the display unit of FIG. 1.

FIG. 10 is a schematic of a computer system wherein the video display is the autostereoscopic display unit of FIG. 1.

DESCRIPTION OF THE PREFERRED EMBODIMENT

Figure 1:
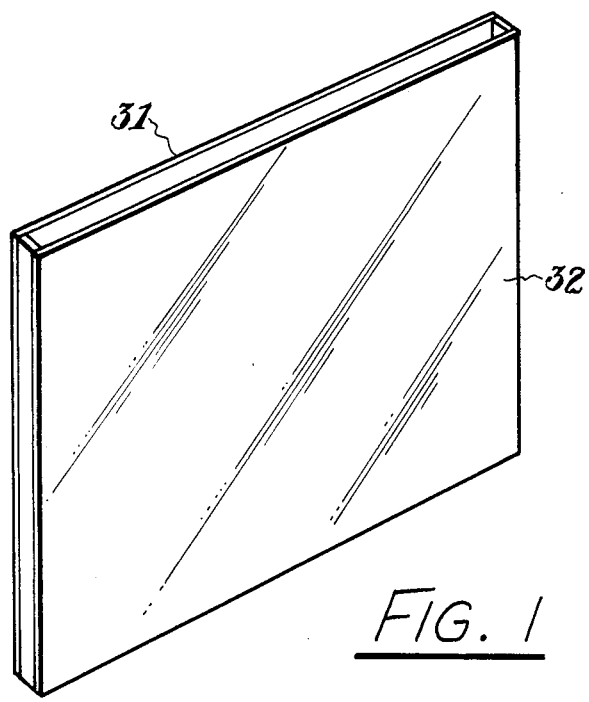
FIG. 1 is a perspective drawing of an autostereoscopic display unit of this invention.
Figure 2:
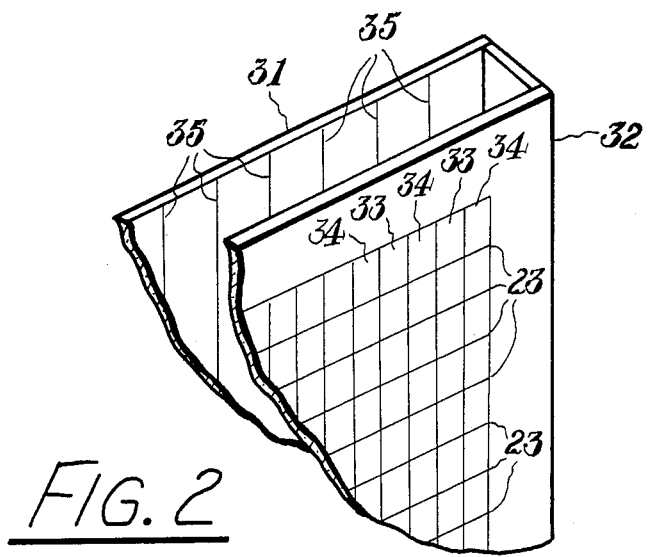
FIG. 2 is an expanded view of a portion of the display unit of FIG. 1.

FIG. 1 illustrates the over all invention. A flat surface 31 contains a plurality (typically about 50 per inch or 20 per cm) of stationary thin vertical lines 35 which emit light. The actual number of lines in any one display can be varied from about 0.5 to about 200 lines per inch or about 0.2 to about 80 lines per cm to achieve a particularly desired result. As shown in FIG. 2 these lines 35 can be continuous or they can be made up of a plurality of shorter line sources arranged in rows. Light emitting lines 35 can be made from tungsten or other wire filaments, one for each line, which emit light due to thermal radiation when an electric current is passed through the line. The light emitting line 35 can also be made of a electroluminescent material which will emit light because of electron excitation and relaxation when an electric current is passed through the line.

In FIG. 1 the flat light valve 32 is positioned in front of and parallel to the screen 31. Typically the light valve 32 has about the same dimensions as the screen 31. Light valve 32 is capable of displaying transparent images by means of a plurality of individual picture elements, commonly referred to as pixels, as shown by rows 23 and columns 33, 34 in FIG. 2. The width of a pixel in a typical display (such as a pocket size receiver or a large wall mounted display) can be varied from about 0.1 to about 2.0 mm, with a typical width being 0.5 mm. The light valve 32 can be made from liquid crystal elements or mechanical elements. Examples of liquid crystal displays are the displays used in many miniature portable television sets. These types of displays are described in detail in an article by P. Andrew Penz, "Nonemissive Displays" in *Flat Panel Displays*, edited by Lawrence E. Tannas, Jr., (Von Nostrand Reinhold Company, New York, N.Y.) which is incorporated herein by reference. Mechanical displays suitable for use in this invention are exemplified by the mechanical displays used in the larger computer controlled flat screen displays. The mechanical displays are described in some detail in U.S. Pat. No. 4,248,501 (also known as the Micro-Curl patent) which is incorporated herein by reference. Other light valve 32 arrangements that may be utilized include those made up of a plurality of individual pockel cells or similar electro-optical devices. The electronic circuitry associated with the screens of this invention are similar to those used for flat screen television receivers or computer displays. The modulated electromagnetic signal which activates the light valve 32 is transmitted to light valve 32 from a transmitter, e.g., computer or television camera, not shown. When the image is to be displayed in color the electromagnetic signal is separated into signals for each of the three light primary colors (red, green and blue) prior to being sent by the transmitter.

When the invention is used as a computer generated graphics display light valve 32 would receive signals from the computer by means of a cable, in the same way an ordinary two dimension display that uses the same type of light valves. The computer's graphics software would be responsible for writing the appropriate image on to the proper lines or columns of vertical of pixels 33, 34 and lines or rows of horizontal pixels 23. This arrangement is schematically shown in FIG. 10 wherein the operating computer 42 with graphics memory 43 generates signals which pass through an interface 44 and into the autostereoscopic display unit 30 of FIG. 1.

When the invention is used as a display for a television system, input signals would come from two or more television cameras looking at a scene from different points equally spaced along a horizontal line as is commonly practiced in the art. Signals from each television camera would be used to modulate the appropriate set of pixel columns 33, 34. In FIG. 8 a system for sending modulated electromagnetic signals to be displayed on the autostereoscopic display 30 of FIG. 1 is shown. In FIG. 8 the video signals from the right camera 24 and the left camera 25, both of which are focused on the same object 26, are fed into a signal mixer 27 which sends the mixed signals to the transmitter 28 that sends the signals to the broadcast antenna 29 for transmission to the air. In FIG. 9 a system for receiving the modulated electomagnetic signals is shown. In FIG. 9 the electormagnetic signals are received by the antenna 40 and relayed to a receiver set 41 which supplies the separated signals to the autostereoscopic display 30 of FIG. 1.

In FIG. 2 the pixels as shown by rows 23 and columns 33, 34 in light valve 32 are all of the same size. Preferably the pixels as shown by rows 23 and columns 33, 34 are arranged in a grid raster pattern in such a way that there are twice as many pixel columns in the vertical direction as there are emitting lines 35 on screen 31. As will be explained below a larger number of pixels 33, 34 may be employed for each light emitting line 35. Alternating pixel columns 33, 34 in FIG. 3, respectively, display vertical sections of left eye and right eye images of a stereoscopic pair.

The balance of the autostereoscopic display unit is made in a manner typically associated with the manufacture of CRT viewing devices and includes among other things the housing, spacing/retaining frame for flat surface 31 and light valve 32, protective screen in front of light valve 32, electrical connections and the like.

Figure 3:
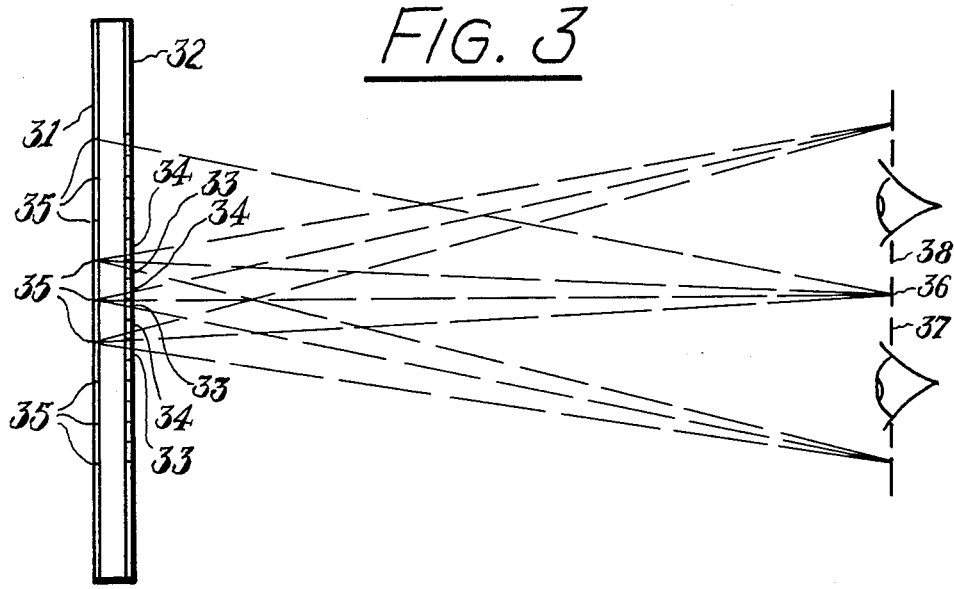
FIG. 3 illustrates the geometry and optical characteristics of the invention when viewing the top of the display unit of FIG. 1.
Figure 4:
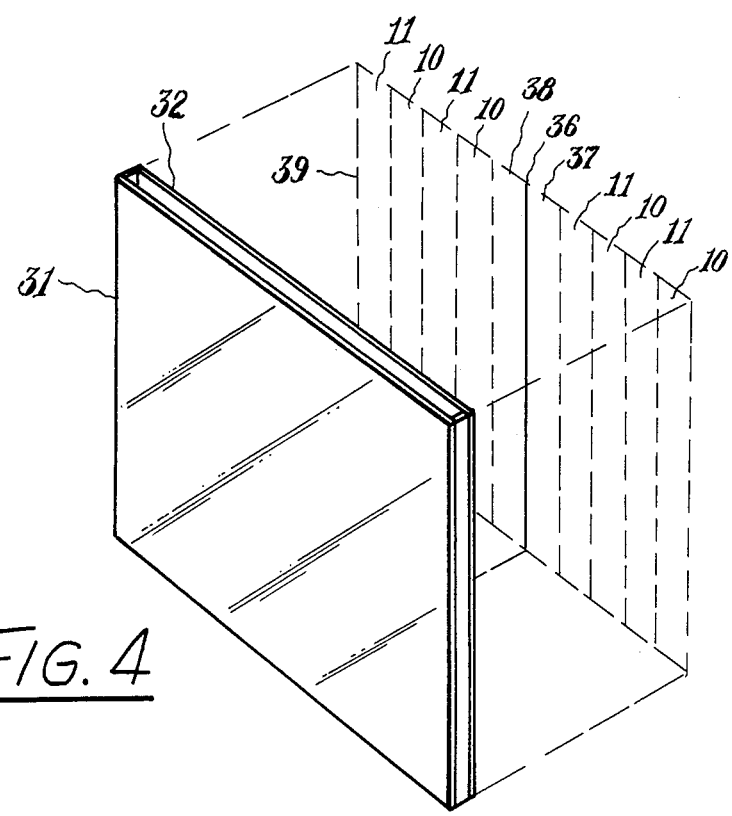
FIG. 4 shows in perspective the geometry and optical characteristics of the display unit of FIG. 1.

FIG. 3 and FIG. 4 illustrate the geometry and optical characteristics of the invention with FIG. 3 being a top view and FIG. 4 a perspective view. The light valve 32 is positioned in such a way that emitting lines 35 in the screen 31 are situated directly behind the boundary between two adjacent pixels 33, 34 as seen from along some vertical line 36 (the center line between the observer's eyes) in front of the display unit. Under these conditions an observer's eye in the viewing zone 37 to the left of the vertical line 36 and within an imaginary plane 39, which is parallel to light valve 32 and contains the vertical line 36, will view all of the emitting lines through pixels 33. Pixels 33 are displaying a left eye image of the stereoscopic pair. This left eye will perceive the left eye image which is being illuminated by the emitting lines 35, but not the right eye image which from the perspective in zone 37 is not being illuminated. In the same manner an observer's eye in zone 38 to the right of line 36 will see all the emitting lines 35 through pixels 34 which are displaying the right eye image of the stereoscopic pair. This eye will perceive only the right eye image. Thus, the observer sitting in front of the display unit with his right eye in zone 38 and his left eye in zone 37 will perceive stereoscopic images.

Figure 6:
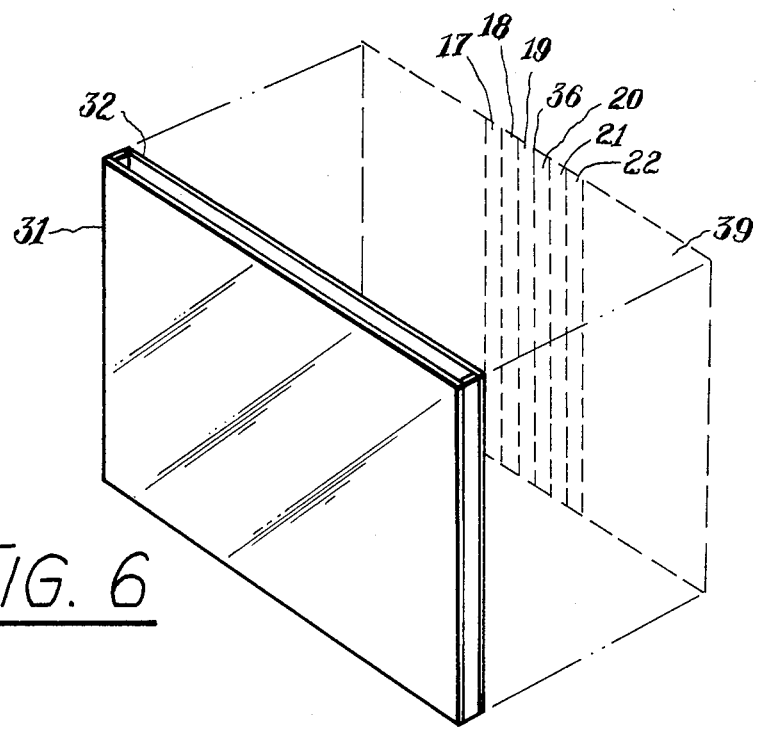
FIG. 6 shows in perspective the geometry and optical characteristics of the display unit of FIG. 5.

It can be shown through geometry that the proper spacing between emitting lines 35 is given by the formula $$s = \frac{2n(d+m)}{d}$$

wherein
  m = the distance from screen 31 to light valve 32
  n = the width of a single pixel 33 or 34 on light valve 32
  d = distance along the normal between light valve 32 and line 36 (see FIGS. 3, 4, 6)

While d in theory can be any value, in practice when using a pixel of 0.5 mm width d will be a value from 30 to 90. The average viewer will view the display unit at a distance of about 60 cm plus or minus up to about 30 cm from the outer surface of light valve 32. Thus, the typical value of d is between about 30 and about 90. It can be shown geometrically that there are a plurality of zones 10 across plane 39 in which only left eye images are seen, and zones 11 across plane 39 in which only right eye images are seen as shown in FIG. 4. Thus, it is possible for a plurality of observers to sit in front of the display unit with their eyes in appropriate zones and perceive stereoscopic images.

Figure 5:
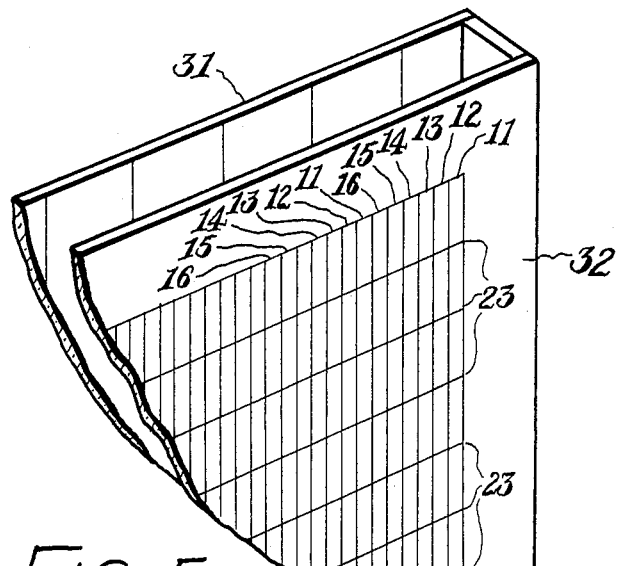
FIG. 5 is a variation of the display unit of FIG. 2 wherein a greater number of individual picture element (pixel) columns are in the light valve display.

The number of rows of horizontal pixels 23 of the light valve 32 and the number of light emitting lines 35 in FIG. 2 and FIG. 5 can be varied depending upon the degree of resolution desired.

Color images can be displayed if each line of pixels as shown by rows 23 and columns 33, 34 on light valve 32 of FIG. 2 is replaced by pixels with independently controllable transparency and having one of the three primary colors. Thus each pixel row 23 is replaced by three rows, namely 23a, 23b, and 23c, row 23a being tinted red, row 23b being tinted green and row 23c being tinted blue. Pixel columns 33, 34 will be a repeating sequence of red, green, blue, red, green, blue et., for the desired length of the column. An expanded view of the display unit when configured for the color displays discussed above is shown in FIG. 7. The display of FIG. 7 is like the display of FIG. 2 except that pixel row 23 has been substituted by pixel rows 23a, 23b and 23c. Full color can then be created in the same manner that such images are created with color dots on a conventional CRT display.

It is possible to use more than two columns of pixels in front of each emitting line 35 as shown in FIG. 5. Six columns of pixels 11, 12, 13, 14, 15, 16 are shown in light valve 32 in front of each line 35 in screen 31 of FIG. 5. Other numbers of columns could be used depending on the size of the screen and desired resolution. The increase in column count would result in more than two zones being present in the vicinity of line 36 and are shown in FIG. 6 as zones 17, 18, 19, 20, 21 and 22. Each set of pixel columns 11–16 would display a different perspective view of some scene, with each view being a perspective image of the scene as seen from the center of zones 17–22 respectively. Thus, from each zone an observer's eye would perceive a different perspective view of a scene. In such a case, the observer could view stereoscopic images from any position where his or her eyes are located in two different zones. The observer would thus have the freedom to move his or her head within zones 17–22 without ruining the stereoscopic effect.

The foregoing configurations and methods have been described in the foregoing specification for the purpose of illustration and not limitation. Many other modifications and ramifications will naturally suggest themselves to those skilled in the art based on this disclosure. These are intended to be comprehended as within the scope of this invention.

The embodiments of the invention in which an exclusive property or privilege is claimed are defined as follows:

1. In an autostereoscopic display unit the improvement which comprises
    (a) a flat surface screen displaying a multiplicity of thin parallel vertical light emitting lines across its surface, said screen remaining dark between said emitting lines, and
    (b) a light valve parallel to and in front of said screen, said light valve having individual picture elements arranged in a grid pattern across its surface, there being at least one pair of vertical columns of individual picture elements for each light emitting line, said light emitting line being located behind and between said pair.

2. The display unit of claim 1 wherein there is one pair of vertical columns of individual picture elements for each light emitting line.

3. The display unit of claim 1 wherein there are at least two pairs of vertical columns of picture elements for each light emitting line, each of said pairs being disposed on both sides of said line.

4. The display unit of claim 1 wherein the display is in color and each horizontal row of the grid pattern of individual picture elements is replaced by three rows of individual picture elements, each one of the three rows of elements being tinted for a different one of the three primary colors.

5. The display unit of claim 1 having at least one pair of vertical columns of individual picture elements for each light emitting line wherein the space between two successive light emitting lines is determined according to the formula $$s = \frac{2n(d + m)}{d}$$

wherein m is the distance from the screen to the light valve, n is the width of a single vertical individual picture element, s is the distance between two successive light emitting lines and d is an integer between 30 and 90.

6. The display of claim 1 used in a television receiving system as the visual display.

7. The display of claim 1 used in a computer system as the graphics display.

8. A method of displaying autostereoscopic images which comprises sending from a transmitter a series of modulated electromagnetic signals that are received by a light valve in a display unit wherein the light valve is in front of and parallel to a flat surface screen,
    said flat screen displaying a multiplicity of thin parallel vertical light emitting lines across its surface, said screen remaining dark between said emitting lines, and
    said light valve having individual picture elements arranged in a grid pattern across its surface, there being at least one pair of vertical columns of individual picture elements for each light emitting line, said light emitting line being located behind and between said pair.

9. The method of claim 8 wherein the images are displayed in color by separating the electromagnetic signals into separate signals for each of the three light primary colors and each horizontal row of the grid pattern of individual picture elements is replaced by three rows of individual picture elements, each one of the three rows of elements being tinted for a different one of the three primary colors.

10. The method of claim 8 wherein the electromagnetic signal is generated by a computer program.

11. The method of claim 8 wherein the electromagnetic signal is generated by a television signal.

* * * * *